C. V. HEMENWAY.

Cloth-Measures.

No. 135,804.  Patented Feb. 11, 1873.

Witnesses.  Inventor.

2 Sheets--Sheet 2.

C. V. HEMENWAY.

Cloth-Measures.

No. 135,804. Patented Feb. 11, 1873.

Witnesses. Inventor.
W. H. Burridge C. V. Hemenway
A. F. Cornell Per Burridge & Co.
Attys.

AM. PHOTO-LITHOGRAPHIC CO. N.Y. (OSBORNE'S PROCESS)

UNITED STATES PATENT OFFICE.

COLLIER V. HEMENWAY, OF NEW LONDON, OHIO, ASSIGNOR OF TWO-THIRDS HIS RIGHT TO J. H. B. BEATTIE AND A. A. POWERS, OF SAME PLACE.

IMPROVEMENT IN CLOTH-MEASURES.

Specification forming part of Letters Patent No. 185,804, dated February 11, 1873.

*To all whom it may concern:*

Be it known that I, COLLIER V. HEMENWAY, of New London, in the county of Huron and State of Ohio, have invented a certain new and Improved Cloth-Measurer; and I do hereby declare that the following is a full, clear, and complete description thereof, reference being had to the accompanying drawing making part of the same.

Figure 1:
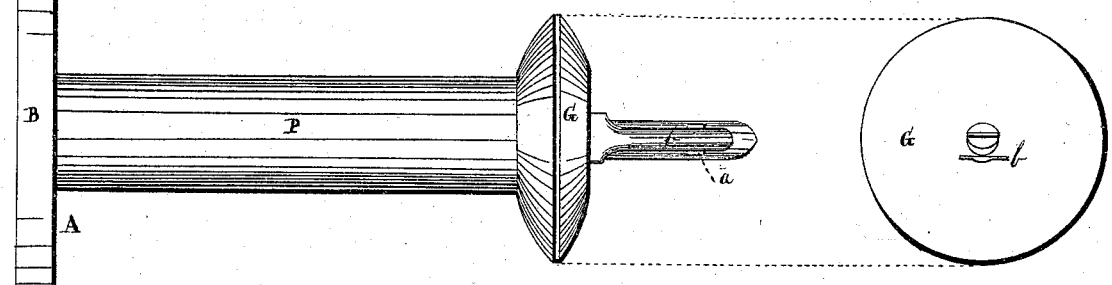
Figure 2:
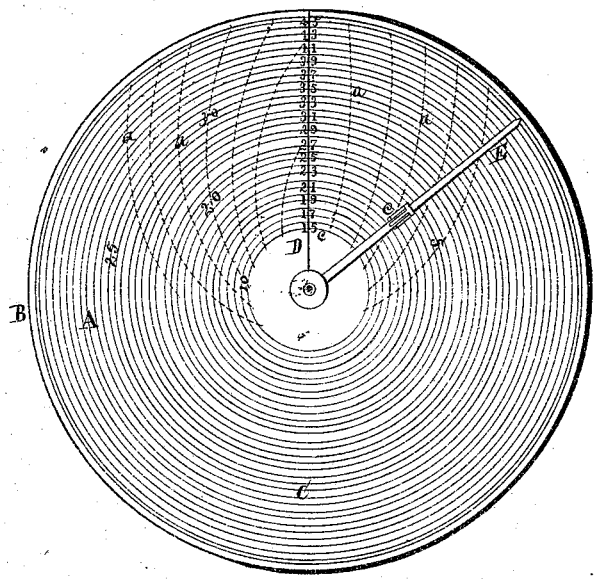
Figure 3:
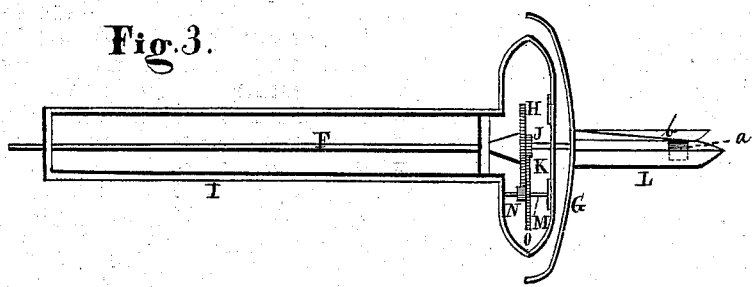
Figure 4:
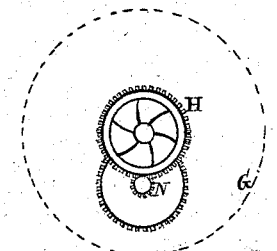

Figure 1 is a side view of the measurer. Fig. 2 is a view of the dial-plate. Fig. 3 is a longitudinal section, showing a side view of the inside mechanical movement. Fig. 4 is an end view of the same.

Like letters of reference refer to like parts in the several views.

The invention relates to an apparatus for measuring cloth, and the object thereof is to measure said cloth when folded up, thereby saving the time and labor of unrolling the cloth for that purpose; and the improvement which forms the subject-matter of this patent consists in the arrangement of the finger carrying the small measuring-roller and pressure-spring for adapting the instrument to be applied to cloth in the roll or package. The special use of the implement is for measuring goods on taking an inventory of stock.

The construction and practical operation of the measurer are as follows:

In the accompanying drawing, Fig. 2, A represents a disk, on one side of which, and inclosed by a flange, B, is inscribed a scale or measure, C, constituting the dial of the implement. Said scale consists of a series of concentric circles, of an equal distance apart, which may be more or less in number, as may be required. Said circles are termed the fold circles, and are numbered on the radial line D. Each alternate circle only is numbered. The numbers of the intermediate ones are known by their relation to those that are numbered. The dotted curved lines *a* of the dial are termed yard-lines. In practice, the lines cover the face of the dial; but a portion of the whole number only is shown in the drawing. Said lines are numbered reading from the right hand of the radial line D around. All of the lines in the drawing are not shown as numbered, though in practice they are, or so many of them as will serve to indicate their order and relation. E is a pointer, secured to the end of a shaft, F, Fig. 3. Said shaft and pointer are operated by the mechanical movements inclosed in the case G, Fig. 1, which, in Fig. 3, is represented as being removed in order that the inside thereof may be seen. The mechanical movements referred to consist of a wheel, H, secured on the shaft F, which has its bearings in the frame I. Close to the center of the wheel H is a small pinion, J, secured on the end of the shaft K. The pinion end of said shaft has its bearing in the end of the shaft F, whereas its opposite end has its bearing in the end of the finger L, and near said opposite end is secured thereon a burr, *a*, the purpose of which will presently be shown. On the shaft M, Fig. 3, is secured a pinion, N, which is made to engage the wheel H; also, on said shaft is secured a wheel, O, which is made to engage the pinion J referred to. The mechanical movements, as aforesaid, are inclosed in a shell, G, and the frame I is inclosed in a tube, P, Fig. 1. The shaft F projects through the disk or dial-plate, and on the projecting end is secured the pointer E referred to, and as shown in Fig. 2.

Having described the construction of the measurer, the practical operation is as follows: A piece of goods to be measured, which piece is folded up, is taken, and the folds counted. Take the middle fold of the whole number, which, for illustration, let it be supposed to be 7, and insert the edge thereof between the burr *a* and the spring *b* at a certain point. Now adjust the indicator *c* on the hand F so that it will point at the figure 13, or *c* on the radial line of the dial corresponding to the whole number of folds in the piece. Pass the measurer once around the edge of the fold that lies between the burr and spring, and the indicator will point to a number on the dial (and which will be on the inner one of the concentric circles) corresponding to the whole number of yards in the piece. If the indicator is adjusted to the number 26 on the radial line as the number of folds in the piece, and the edge of the middle fold is placed between the burr and spring, as in the former instance, and is passed once around the fold, the indicator will point to a number on the circle of yards corresponding to the number of yards in the piece, as in the above case; and so on for any number of folds that the piece may have. By taking the middle fold of the whole number an average is obtained, and the whole number of yards in the piece is shown on the curved lines, which, as above-said, have each a number as well as the circles; hence once around the middle fold of the whole number will give by the index the number of yards in the piece, which will be read on the curved lines, as aforesaid.

It will be obvious that as the edge of the goods is placed between the burr and spring it is pressed down upon the burr, thereby causing it to rotate, and thus give motion to the mechanical movement and the hand of the dial, the movement of which and the arrangement of the scale on the dial being so calculated and arranged as to bring about the results in measuring, as above set forth.

Claim.

What I claim as my invention, and desire to secure by Letters Patent, is—

The burr $a$ and pressure-spring $b$, in combination with the mechanical movement described, shaft F, pointer E, and indicator $c$, in the manner as and for the purpose specified.

COLLIER V. HEMENWAY.

Witnesses:
  J. H. BURRIDGE,
  W. H. BURRIDGE.